United States Patent
Bana et al.

(10) Patent No.: US 10,291,071 B2
(45) Date of Patent: May 14, 2019

(54) WIRELESS POWER AND DATA TRANSFER FOR UNMANNED VEHICLES

(71) Applicant: THE UNITED STATES OF AMERICA AS REPRESENTED BY THE SECRETARY OF THE NAVY, Washington, DC (US)

(72) Inventors: Viktor S. Bana, San Diego, CA (US); Gregory W. Anderson, San Diego, CA (US); Wayne P. Liu, San Diego, CA (US); John D. Rockway, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 329 days.

(21) Appl. No.: 15/001,101

(22) Filed: Jan. 19, 2016

(65) Prior Publication Data
US 2017/0207658 A1 Jul. 20, 2017

(51) Int. Cl.
*H02J 50/12* (2016.01)
*H02J 50/15* (2016.01)
*H02J 50/90* (2016.01)
*H02J 7/02* (2016.01)

(52) U.S. Cl.
CPC ............ *H02J 50/12* (2016.02); *H02J 7/025* (2013.01); *H02J 50/15* (2016.02); *H02J 50/90* (2016.02)

(58) Field of Classification Search
USPC ....................................................... 307/104
See application file for complete search history.

(56) References Cited

U.S. PATENT DOCUMENTS

| | | | |
|---|---|---|---|
| 6,963,263 B1 | 11/2005 | Cook et al. | |
| 8,577,288 B2 | 11/2013 | Rhodes et al. | |
| 8,716,902 B2 | 5/2014 | Rhodes et al. | |
| 9,860,358 B2* | 1/2018 | Park | H04M 1/7253 |
| 2009/0271998 A1* | 11/2009 | Carlen | G01D 18/00 33/706 |
| 2014/0253025 A1* | 9/2014 | Van Wiemeersch | H02J 50/70 320/108 |
| 2014/0257614 A1* | 9/2014 | Niizuma | B60L 11/182 701/22 |
| 2015/0223890 A1* | 8/2015 | Miller | A61B 5/117 705/2 |
| 2016/0049799 A1* | 2/2016 | Takatsu | H02J 5/005 307/104 |
| 2016/0144982 A1* | 5/2016 | Sugumaran | B64C 25/32 244/103 R |
| 2016/0334793 A1* | 11/2016 | Celikkol | G01C 21/20 |
| 2016/0336805 A1* | 11/2016 | Yoshida | H02J 17/00 |
| 2017/0141583 A1* | 5/2017 | Adolf | H02J 5/005 |

* cited by examiner

*Primary Examiner* — Adam D Houston
(74) *Attorney, Agent, or Firm* — Naval Information Warfare Center Pacific; Kyle Eppele; Elliott J. Deaderick

(57) ABSTRACT

A system and method provide for wireless power and/or data transfer between devices, such as coils. A first device, operatively connected to an energy source, is positioned within a wireless transmission range of a second device, which may be operatively coupled to an unmanned vehicle. Power and/or data is wirelessly transferred to/from the energy source from/to the unmanned vehicle via the first device and the second device.

18 Claims, 6 Drawing Sheets

WIRELESS POWER AND DATA TRANSFER FOR UNMANNED VEHICLES

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; phone (619) 553-5118; email ssc_pac_T2@navy.mil; reference Navy Case Number 102544.

BACKGROUND

There exists a need for an improved system and method that allow for wireless energy and/or data transfer between unmanned vehicles, sensor units, and refueling units.

DETAILED DESCRIPTION OF SOME EMBODIMENTS

Disclosed herein is are embodiments of a system and method that provide for wireless power and/or data transfer in air or other fluid mediums by way of a towed, tethered, or mechanically linked off-body coil device that can passively or autonomously be positioned proximate to or onto a mating coil device, which may also be towed, tethered, mechanically linked or autonomously driven. Various embodiments of the system and method may use components such as mechanical or cable linkage, wire coils, positioning devices, homing, capture, and/or delivery devices. Although the embodiments are primarily discussed with reference to wireless energy and/or data transfer using unmanned vehicles, such systems and methods may also be utilized with manned vehicles, including surface vehicles, undersea vehicles, airborne vehicles, and road-based vehicles.

Figure 1A:
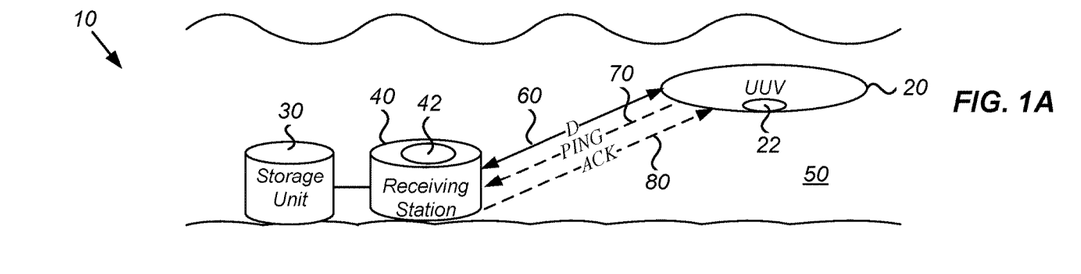
FIGS. 1A-1C show diagrams illustrating the operation of an embodiment of a system and method in accordance with the Wireless Power and Data Transfer for Unmanned Vehicles.
Figure 1B:
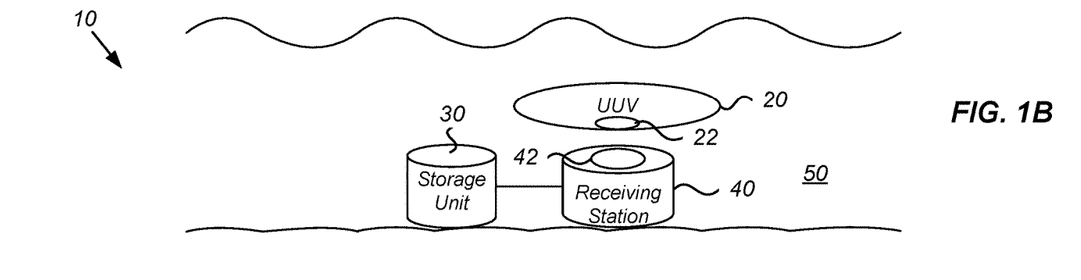
Figure 1C:
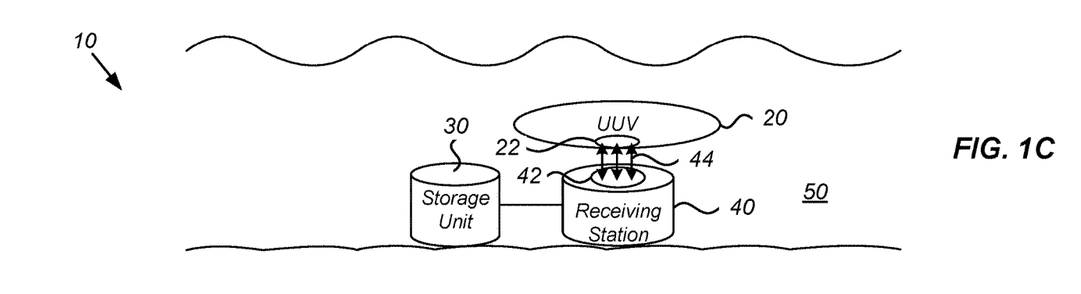

FIGS. 1A-1C show diagrams 10 illustrating the operation of an embodiment of a system and method in accordance with the Wireless Power and Data Transfer for Unmanned Vehicles. Diagram 10 includes an unmanned underwater vehicle (UUV) 20, a storage unit 30, and receiving station 40 in an underwater environment 50. It should be noted that while diagram 10 depicts a system in an underwater environment, a similarly configured system may function in a similar manner in a land-based or air-based environment. Further, although storage unit 30 and receiving station 40 are shown separately, in some embodiments the two may be contained together in a single enclosure (not shown). Further, for simplicity, the receiving and transmitting station roles may be interchangeable between the ground platform (i.e. storage unit 30 and receiving station 40) and UUV 20. For example, the ground platform can store and then pass power/data to UUV 20 (with receiver station onboard) or the ground platform can receive and store power/data from UUV 20.

UUV 20 includes a coil 22. It should be noted that although UUV 20 is shown with only one coil 22, that UUV 20 or any other UV that may be used in accordance with the systems and methods disclosed herein, may include multiple coils towed by the UV or positioned in similar or different locations with respect to the UV. In one embodiment, coil 22 is embedded within the underside of UUV 20, while in another embodiment coil 22 is secured to the exterior of the underside of UUV 20.

The positioning of coil 22 at the underside of UUV 20 helps to ensure a better wireless power and data transfer with a coil 42 within receiving station 40, which is configured for UUV 20 to be situated directly overhead during wireless power and data transfer. However, it should be recognized that coil 22 may be situated in other areas of UUV 20, such as near the topside, fore, or aft, depending upon where UUV 20 is to be positioned with respect to coil 42 within receiving station 40. As an example, if the front of UUV 20 is to be positioned closest to coil 42, coil 22 may be situated at the front of UUV 20.

Coils 22 and 42 may be any type of coil that allows for wireless power and data transfer. As an example, coil 22 and 42 may be configured such as coil structure 700 shown in FIG. 8. Coils 22 and 42 may be configured to be a transmitting coil, a receiving coil, or both a transmitting and receiving coil, depending upon the specific configuration of the operating system. An example coil that may be used in accordance with the embodiments described herein is discussed with reference to FIG. 8.

In operation, when UUV 20 comes within a distance D to receiving station 40, as shown by arrow 60 in FIG. 1A, UUV 20 sends a ping, shown by arrow 70, to receiving station 40. Upon receipt, receiving station 40 sends a ping receipt acknowledgement, shown by arrow 80, to UUV 20. After the ping acknowledgement is received by UUV 20, UUV 20 begins its positioning with respect to coil 42 and receiving station 40 to commence wireless data and/or power transfer. For example, as shown in FIGS. 1A-1C, coil 22 is positioned at the underside of UUV 20 and UUV 20 is configured to hover directly over coil 42 during wireless power and/or data transfer as shown in FIG. 1B.

To position UUV 20 in such a position, several methods may be used. In some embodiments, the positioning is performed autonomously using a signal, such as an optical or acoustic signal, from UUV 20 and/or receiving station 40. In some embodiments, the positioning is performed autonomously by UUV 20 using machine vision. Once coil 22 in UUV 20 is positioned directly over coil 42 or substantially close to coil 42 depending upon the wireless transmission/reception capabilities of coils 22 and 42, wireless power and/or data transfer between coils 22 and 42 may commence, as shown by arrows 44 in FIG. 1C. Although coil 22 is shown to be smaller than coil 42, it should be recognized that coils 22 and 42 may be similarly sized or may be smaller or larger with respect to one another without departing from the scope of the systems and/or methods disclosed herein.

Figure 2:
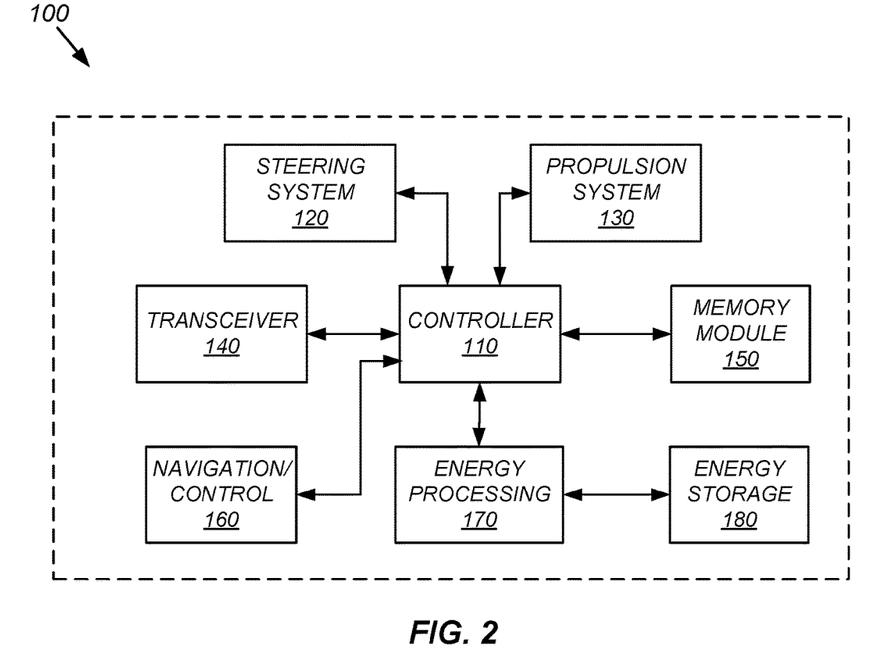
FIG. 2 shows a component diagram of an embodiment of an unmanned vehicle that may be used in accordance with the Wireless Power and Data Transfer for Unmanned Vehicles.

As shown, UUV 20 is configured to operate in an underwater environment. However, as noted above, a differently configured unmanned vehicle (UV) may be used which is configured to operate in a land-based and/or air-based environment. An example component configuration that may be used for UUV 20 or other UV is shown in diagram 100 shown in FIG. 2. As shown in FIG. 2, the system may include a controller 110 which is operatively connected to steering system 120, propulsion system 130, transceiver 140, memory module 150, navigation/control module 160, and energy processing module 170, which is operatively connected to an energy storage unit 180. Controller 110 may include the appropriate software and/or circuitry to allow for UUV 20 or other UV to perform the functions as shown and described herein, such as the establishment of communication, positioning of coil devices and vehicles, and wireless transfer of energy and/or data.

Further, it should be recognized by a person having ordinary skill in the art that the system for UUV 20 or other UV may be configured with more or less components and/or modules than those shown and described herein, depending upon factors including, but not limited to, the type, purpose, and operation of the selected UV or UUV. As an example, UUV 20 or other UV may have components for DC-AC or AC-DC power conversion or AC-AC conversion for allowing wireless energy transfer.

Storage unit 30 serves as the source of data and energy transmitted to a UV, such as UUV 20, and/or a storage unit for data and energy received from a UV when the UV is transferring data and/or energy to the UV. In some embodiments, storage unit 30, or any of the storage units shown and described herein, may comprise a self-sustaining unit, such as a renewable energy source. In some embodiments, storage unit 30 may include various types of energy sources, such as a fixed energy source and a renewable energy source. Further, in some embodiments, storage unit 30 may be a permanent source of energy and/or data such as a land-based power line or data network. In such embodiments, the distance between receiving station 40 and storage unit 30 may be considerable.

Figure 3:
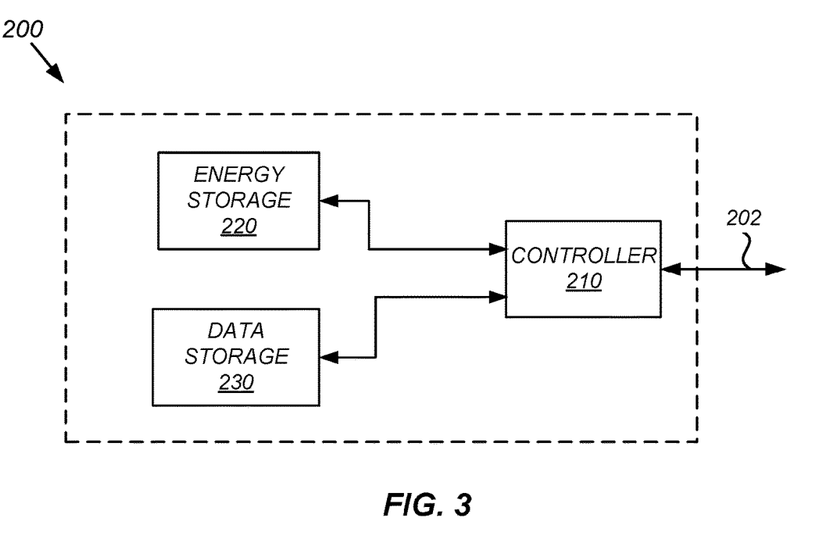
FIG. 3 shows a component diagram of an embodiment of a data and energy storage unit that may be used in accordance with the Wireless Power and Data Transfer for Unmanned Vehicles.

An example component configuration of storage unit 30 is shown in diagram 200 shown in FIG. 3. As shown in FIG. 3, storage unit 30 may include a controller 210 which is configured with the appropriate circuitry and processing instructions therein to receive data and energy 202 from, for example, UUV 20, and route it to energy storage 220 and data storage 230, which are operatively connected to controller 210, as appropriate. Controller 210 is further configured with the appropriate circuitry and processing instructions therein to cause data and energy 202 to be transferred from energy storage 220 and data storage 230 to a UV, such as UUV 20.

Figure 4:
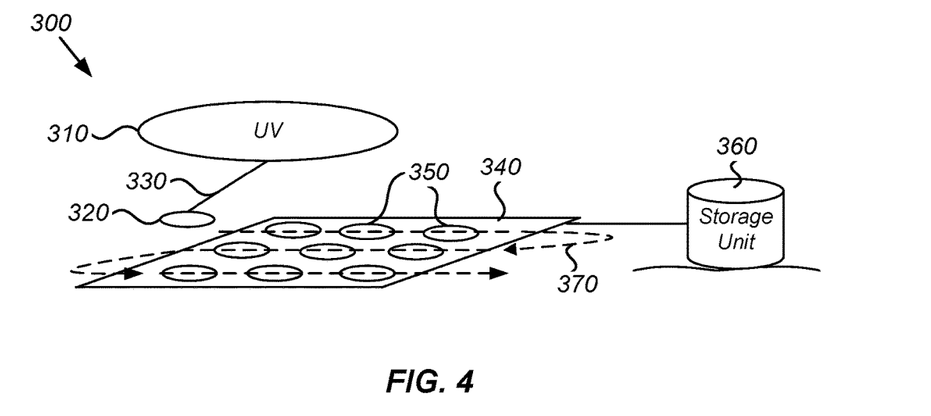
FIG. 4 shows a diagram illustrating a power and data transfer method using coils embedded within a mat in accordance with the Wireless Power and Data Transfer for Unmanned Vehicles.
Figure 5:
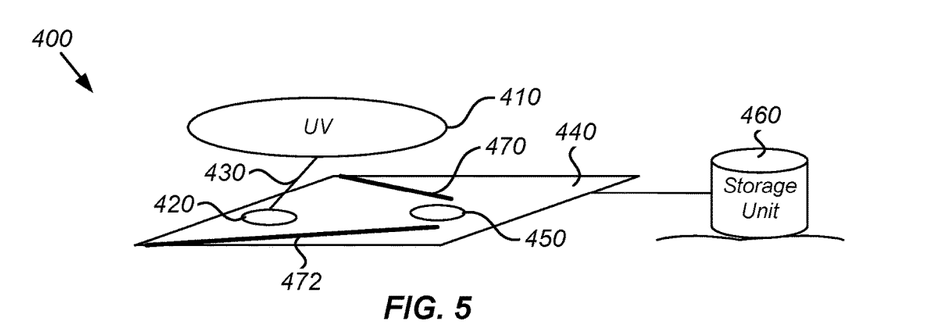
FIG. 5 shows a diagram illustrating the positioning of a first coil near a second coil embedded in a mat using guide rails, in accordance with the Wireless Power and Data Transfer for Unmanned Vehicles.

Receiving station 40 may comprise any device, structure, or mechanism that has a coil integrated into it, disposed thereon, or otherwise connected thereto that allows for a UV to position itself such that wireless energy and/or data transfer may occur. As an example, receiving station 40 may be a mat, such as is shown in FIGS. 4 and 5. As another example, receiving station 40 may be an energy source itself having a coil embedded therein, such as is shown in FIG. 7B. In such an embodiment, a separate storage unit may or may not be used, depending in part upon the particular application and specific system configuration.

FIG. 4 shows a diagram 300 illustrating a power and data transfer method using coils embedded within a mat in accordance with the Wireless Power and Data Transfer for Unmanned Vehicles. As shown, a UV 310 is towing a coil 320 connected to a tether 330 over a mat 340. However, it should be noted that, in lieu of being towed, coil 320 could be dropped over mat 340, floated over mat 340, dragged, or otherwise passively brought into position with respect to coils 350 contained within mat 340. A further example of such passive methods includes using a static alignment structure such as converging guard rails (see FIG. 5), a capture ramp, or magnets disposed on or embedded within the coils.

As an example, coil 320, or any of the other tethered, towed, or otherwise disposed coils shown and described herein, may be an active or autonomous coil with three-dimensional translation capabilities to help locate, mate, or otherwise latch onto coils such as those located on mat 340 or otherwise operatively connected to an energy source. Such coils could use a variety of methods for positioning themselves, including but not limited to, propelling, driving, flying, or swimming, using homing devices that utilize, for example, optical, chemical, acoustic, and/or temperature-based methods, propulsors, wheels, thrusters, vortex generators, buoyancy devices, and other maneuvering methods.

As an example, mat 340, or any of the mats shown and described herein, may be positioned on land, on the surface of a body of water, or underwater. In embodiments wherein mat 340 is positioned within the maritime domain, mat 340 may be moored or integrated to a surface vessel, submarine, buoy, ocean/wave glider, or other maritime platform as would be recognized by a person having ordinary skill in the art.

Mat 340 includes a plurality of coils 350 embedded/integrated/disposed therein. As an example, coils 350 are recessed within mat 340 such that as coil 320 is being directed over mat 340 it is passively directed towards coils 350. As an example, coils 350 may be serially connected or connected in a grid, and are connected to an energy source 360. Further, in some embodiments, coils 350 may be unconnected from each other and form an array of coils each individually connected to energy source 360. Coils 350 are configured to wirelessly transfer and/or receive data to/from coil 320 as coil 320 proceeds over coils 350 such as in a path as shown by arrow 370. Coils 320 and 350 may be configured to be transmitting coils, receiving coils, or both a transmitting and receiving coils, depending upon the specific configuration of the operating system.

In some embodiments, coils 320 and 350, as well as any other coils shown and described herein, may contain one or more magnets and/or mechanical devices within or disposed about the coil to help capture and/or position a second coil in such a manner that wireless energy and/or data transfer may occur with maximum efficiency. For example, coils 350 may have a ring of magnets disposed around the perimeter thereof to help attract similarly situated magnets, but of opposite polarity, disposed around the perimeter of coil 320.

FIG. 5 shows a diagram 400 illustrating the positioning of a first coil near a second coil embedded in a mat using guide rails, in accordance with the Wireless Power and Data Transfer for Unmanned Vehicles. As shown UV 410 is towing a coil 420 connected to a tether 430 over a mat 440. As an example, mat 440 may be positioned on land or underwater. Mat 440 includes a coil 450 embedded/integrated/disposed therein.

Coil 450 is connected to an energy source 460. Coil 450 is configured to wirelessly transfer and/or receive data to/from coil 420 as coil 420 is positioned directly over coil 450 or substantially close to coil 450 depending upon the wireless transmission/reception capabilities of coils 420 and 450. Coils 420 and 450 may be configured to be transmitting coils, receiving coils, or both a transmitting and receiving coils, depending upon the specific configuration of the operating system.

Guide rails 470 and 472 are disposed on mat 440 and angled in such a manner to direct coil 420 towards coil 450 as shown by arrow 480. As an example, guide rails 470 and 472 may comprise various materials, including non-corrosive metals and polymers. Further, guide rails 470 and 472 may be designed to be various heights depending upon, for example, the location of coil 420 from mat 440 and/or the thickness of coil 420.

Figure 6:
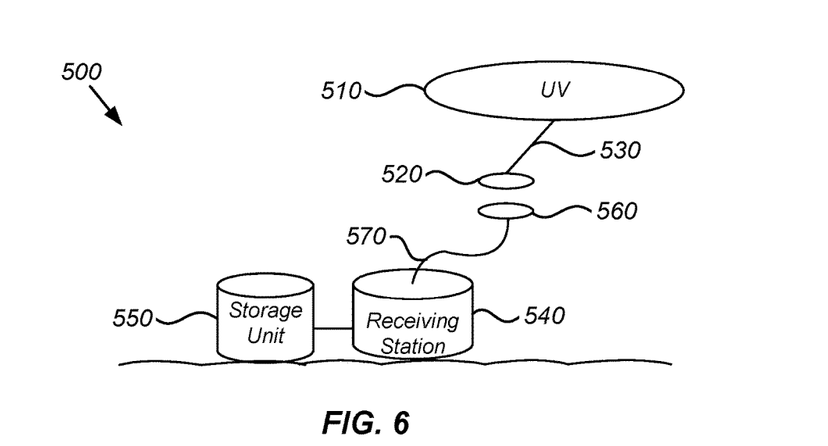
FIG. 6 shows a diagram illustrating the autonomous positioning of a first coil near a second coil towed by an unmanned vehicle in accordance with the Wireless Power and Data Transfer for Unmanned Vehicles.

FIG. 6 shows a diagram 500 illustrating the autonomous positioning of a first coil near a second coil that is towed by, autonomously deployed from or embedded into the hull of the UV in accordance with the Wireless Power and Data Transfer for Unmanned Vehicles. As shown UV 510 is towing a coil 520 connected to a tether 530 near a receiving station 540. Receiving station 540 is connected to an energy source 550. Receiving station is connected to a coil 560 by a tether 570. Coil 560 is configured to wirelessly transfer to and/or receive data from coil 520 as coil 520 is positioned directly over the coil 560 or substantially close to coil 560 depending upon the wireless transmission/reception capabilities of coil 520 and coil 560. Coils 520 and 560 may be configured to be transmitting coils, receiving coils, or both a transmitting and receiving coils, depending upon the specific configuration of the operating system.

As an example of operation, receiving station 540 may spool out tether 570 after it sends a ping receipt acknowledgement to UV 510. UV 510 may then position itself such that coils 520 and 560 are in position to wirelessly transmit and/or receive data and/or energy as discussed above. When transmission is complete, receiving station 540 may retract tether 570. The system configuration shown in FIG. 6 allows for receiving station 540 to engage in wireless data and energy transfer with UV 510 at further distances, providing increased safety due to the increased standoff distance.

Figure 7A:
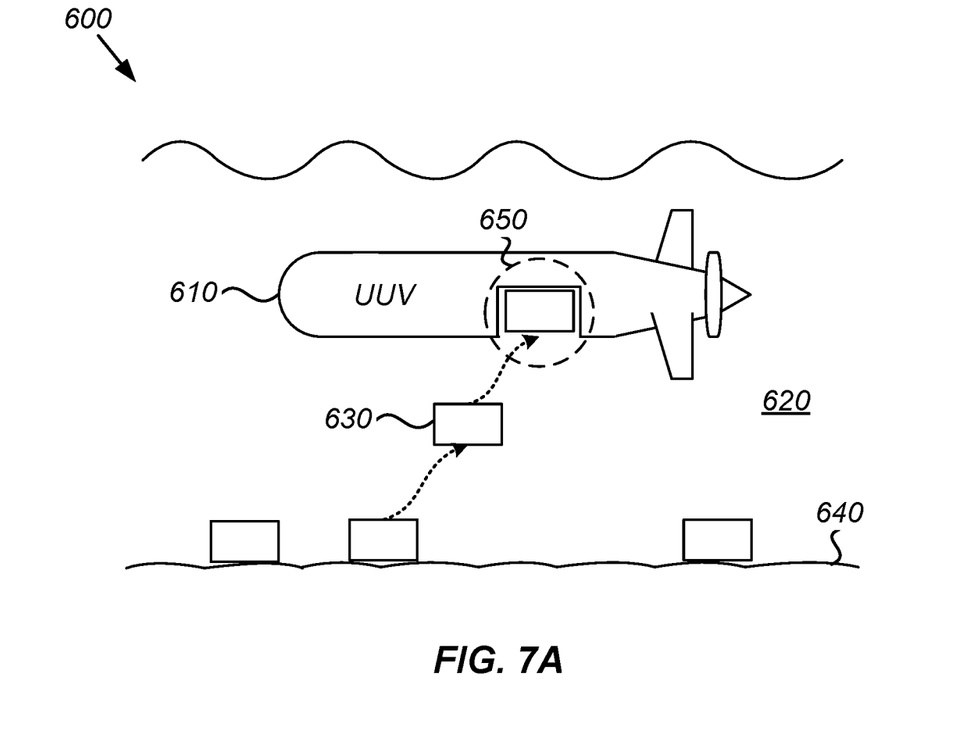
FIGS. 7A and 7B show diagrams illustrating the positioning of a passive or autonomous storage unit with an integrated coil into a payload bay of an unmanned vehicle in accordance with the Wireless Power and Data Transfer for Unmanned Vehicles.
Figure 7B:
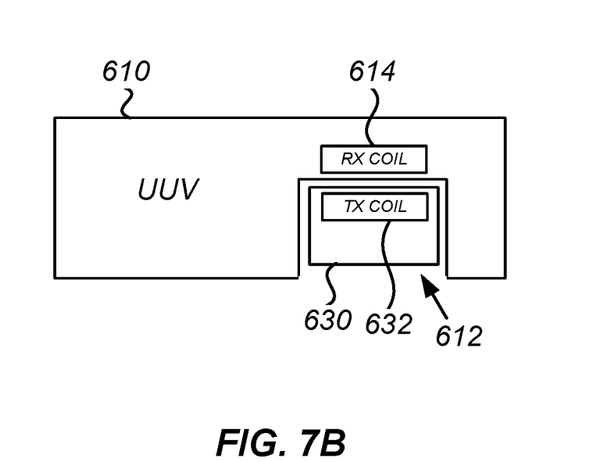

FIGS. 7A and 7B show diagrams illustrating the positioning of a passive or autonomous storage unit with an integrated coil into a payload bay of an unmanned vehicle in accordance with the Wireless Power and Data Transfer for Unmanned Vehicles. FIG. 7B shows a detailed portion of dashed circle 650 shown in FIG. 7A. The configuration shown in FIGS. 7A and 7B provides for the ability to "hot swap" energy and/or data storage units in and out of UVs.

As shown in FIG. 7A, a UUV 610 is located in an underwater environment 620. Multiple storage units 630 may be strategically located at various distances on floor 640, which may be the ocean floor, bay floor, river floor, etc. UUV 610 has an opening 612 (shown in FIG. 7B) that is configured in size and shape such that storage unit 630 may be disposed therein. Further, UUV 610 may also have a coil 614 contained therein, such as proximate to opening 612 as shown in FIG. 7B, to allow for wireless energy and/or data transfer with coil 632 disposed within storage unit 630. As an example, opening 612 may be located in a payload bay of UUV 610. Although FIG. 7B shows coil 614 as a receiving coil and coil 632 as a transmitting coil, it should be recognized that these functions could be switched depending upon whether or not storage unit 630 was supplying or receiving energy and/or data. It should be recognized that when depleted of energy, storage unit 630 can also be released from opening 612 to allow for a freshly charged storage unit 630 to enter and transfer energy/data to UUV 610.

As an example, storage unit 630 may be configured similarly as shown in FIG. 3, having both an energy storage and a data storage. In some embodiments, storage unit 630 may be only an energy storage unit. In such an embodiment, storage unit 630 may be, for example, a battery or a fuel cell. A fuel cell storage unit 630 may be, for example, a renewable fuel cell. In an underwater environment 620, an example of a suitable renewable fuel cell is a microbial fuel cell. However, it should be noted that other fuel cells, such as a hydrogen fuel cell, may be used without departing from the scope of the disclosed subject matter herein.

Further, storage unit 630 may be passive or autonomous. A passive storage unit 630 would require UUV 610 to position itself such that opening 612 is over storage unit 630. Then, UUV 610 would have to use some mechanism to secure storage unit 630 to UUV 610. As an example, storage unit 630 could be secured to UUV 610 by a number of methods including, but not limited to magnetic, hydraulic, or buoyancy methods. An autonomous storage unit 630 would contain the appropriate circuitry and components (e.g. accelerometers, thrusters, strobe lights, vision or acoustic guidance sensors) therein to allow for autonomous positioning of storage unit 630 from floor 640 to within opening 612 as is shown by the arrows in FIG. 7A.

As an illustrative example of operation, a first device 632 operatively connected to an underwater energy source 630 and having a processor therein (such as controller 210 in FIG. 3) containing circuitry configured to establish communication with a UUV 610 and to position the first device 632 within a wireless transmission range to a second device 614 connected to UUV 610, are positioned within a wireless transmission range (such as shown in FIG. 7B), wherein upon such positioning the processor is further configured to initiate wireless transfer of at least one of power and data from energy source 630 to UUV 610 via first device 632 and second device 614.

In some embodiments, UUV 610 may wait until all of the data and/or power is transferred to it from energy source 630 prior to continuing on its way. In such a scenario, energy source will reposition itself such that it is no longer located within opening 612 prior to the departure of UUV 610. In some embodiments, once energy source 630 is located within opening 612 and power and/or data transfer has begun, UUV 610 may continue on to perform its operational scenarios while the power and/or data transfer is occurring.

As discussed with reference to method 900 below, UUV 610 may then find another energy source location or return to the same energy source location when it is in need of additional power and/or data.

Figure 8:
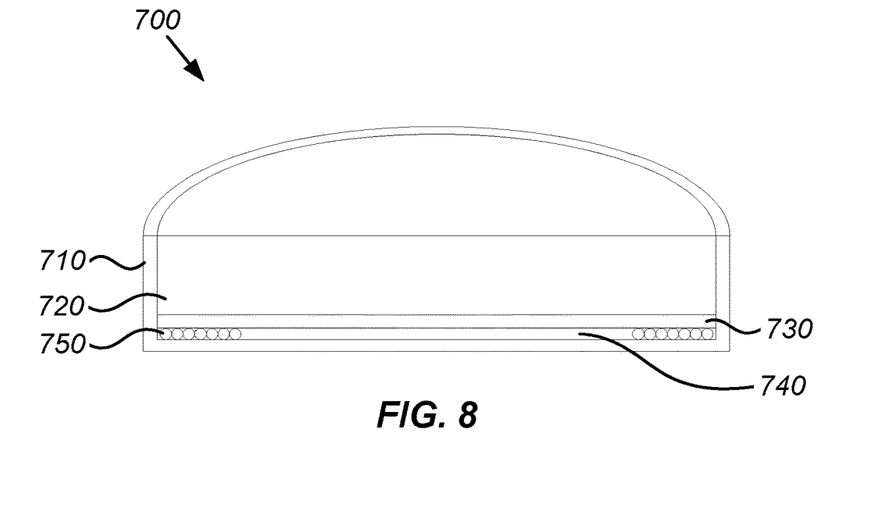
FIG. 8 shows a cross-section view of an embodiment of a coil that may be used in accordance with the Wireless Power and Data Transfer for Unmanned Vehicles.

FIG. 8 shows a cross-section view of an embodiment of a coil structure 700 that may be used in accordance with the Wireless Power and Data Transfer for Unmanned Vehicles. Coil structure 700 may include a housing 710 containing a waterproofing sealant 720 disposed over a shielding plate 730. Housing 710 may comprise a ceramic, such as Alumina AD-85 having a thermal conductivity of 16.0 W/(m*K), to provide for thermal dissipation which is approximately 28.5 times better than water. As another example, housing 710 may comprise a thermally conductive polyurethane resin, such as TC-2920F manufactured by the 3M® Corporation, which has a thermal conductivity of 0.65 W/(m*K) that is three times better than non-TC polyurethane and approximately 16% better than water.

As an example, sealant 720 may be a polyurethane waterproofing sealant. Shielding plate 730, which may comprise ferrite, powder iron, or a meta-material, is disposed over a thermally conductive sealant 740, within which is disposed a coil 750. Coil 750 may be comprised of various materials including copper wire, Litz wire, graphene, or superconductor material. As an example, coil 750 may comprise 700 strands of 40 AWG wire (~12 AWG) and may be approximately 0.12" in diameter, providing for a high current (>25 A) and low impedance (1.5 Ω/kft) at 100 kHz.

One embodiment of a coil that may be used for transmission of power and/or data may include a spiral wire wound 13 turns with an outside diameter of 5.7" and an inside diameter of 2.0", and 18 uH. One embodiment of a coil that may be used for reception of power and/or data may include a spiral wire wound 10 turns with an outside diameter of 4.8" and an inside diameter of 2.0", and 10 uH.

Coil structure 700 may further include a plurality of resistors located within housing 710 to help generate the thermal load. For example, housing 710 may contain 30 resistors connected in series to produce a 100 W thermal load at 120 VAC.

Figure 9:
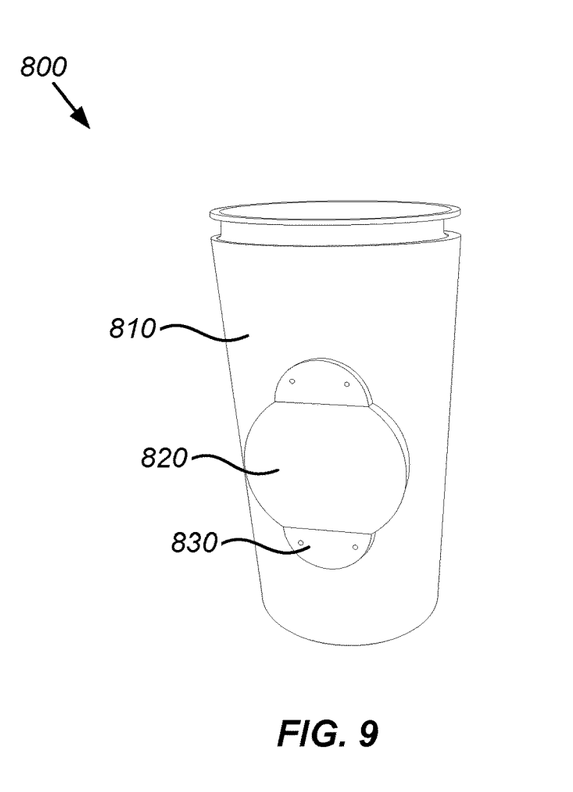
FIG. 9 shows a bottom view of an embodiment of an unmanned vehicle with an integrated coil that may be used in accordance with the Wireless Power and Data Transfer for Unmanned Vehicles.

FIG. 9 shows a bottom view of an embodiment of an unmanned vehicle with an integrated coil that may be used in accordance with the Wireless Power and Data Transfer for Unmanned Vehicles. As shown, vehicle 810 includes a coil 820 mounted to the underside thereof by a bracket 830, providing a large flat area for wireless power and/or data transfer as well as reduced drag for vehicle 810. It should be recognized that coil 820 may be secured to vehicle 810 by other structures or hardware without departing from the scope of the invention. As an example, coil 820 is configured the same as coil structure 700 shown in FIG. 8.

Figure 10:
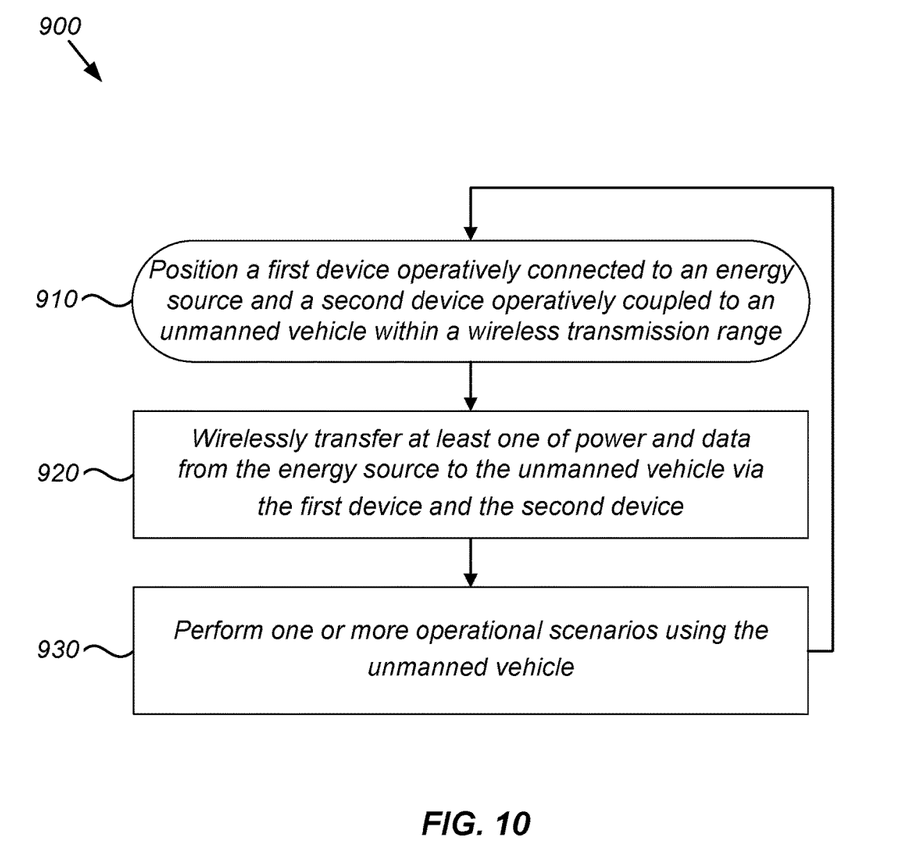
FIG. 10 shows a flowchart of an embodiment of a method in accordance with the Wireless Power and Data Transfer for Unmanned Vehicles.

FIG. 10 shows a flowchart of an embodiment of a method in accordance with the Wireless Power and Data Transfer for Unmanned Vehicles. FIG. 10 shows one embodiment of method 900 to include steps 910-930, other embodiments of method 900 may contain fewer or more steps. Further, while in some embodiments the steps of method 900 may be performed as shown in FIG. 10, in other embodiments the steps may be performed in a different order, or certain steps may occur simultaneously with one or more other steps.

Step 910 involves positioning a first device, such as, for example, device 42 shown in FIGS. 1A-1C, device 560 shown in FIG. 6, or device 632 shown in FIG. 7B, operatively connected to an energy source, such as, for example, contained within storage unit 30 shown in FIGS. 1A-1C or storage unit 550 shown in FIG. 6, or storage unit 630 shown in FIG. 7B, and a second device, such as, for example, device 22 shown in FIGS. 1A-1C, device 520 shown in FIG. 6, or device 614 shown in FIG. 7B, operatively coupled to a UV, such as, for example, UUV 20 shown in FIGS. 1A-1C, UV 510 shown in FIG. 6, or UUV 610 shown in FIG. 7B, within a wireless transmission range, such as, for example, distance D shown in FIG. 1B, the distance between devices 520 and 560 shown in FIG. 6, or the distances between devices 614 and 632 shown in FIG. 7B. In some embodiments, such as shown in FIGS. 1B and 1C, FIG. 6, and FIG. 7B, the first device is not in contact with the second device when the first device and the second device are within the wireless transmission range.

It should be recognized by a person having ordinary skill in the art that the positioning of the first device and second device within a wireless transmission range of step 910 could involve only movement of the first device, only movement of the second device, or a combination of movement from both the first device and the second device. For example, as shown in FIG. 4, devices 350 are fixed within mat 340. Thus, the only device moving is device 320 tethered to UV 310. As another example, if devices 520 and 560 in FIG. 6 are both autonomous, each device could position itself to be into wireless transmission range with one another.

In some embodiments, step 910 is performed passively using a static alignment structure, such as guard rails 470 and 472 shown in FIG. 5. In embodiments where the first device is contained within a mat, such as mat 340 or 440, connected to the energy source, and the second device is towed by the UV, the passive positioning of the second device may be performed by at least one of magnets, such as those disposed around the coils, and mechanical devices, such as guard rails 470 and 472, disposed on the mat and configured to capture and guide the second device towards the first device.

In some embodiments, step 910 is performed autonomously using a signal from the UV. As an example, the signal may be either an optical signal or an acoustic signal. In some embodiments, step 910 is performed autonomously by the first device using machine vision. In embodiments using an optical signal, the UV may contain optical sensors such as photomultiplier tubes or cameras to assist in performing step 910.

Step 920 involves wirelessly transferring at least one of power and data from the energy source to the UV via the first device and the second device, such as shown by arrows 44 between devices 22 and 42 in FIG. 1C. As an example, the wireless transmission may be performed using one of optical transmission, inductive transmission, magnetic resonance transmission, and ultrasonic transmission. Further, the wireless transfer may occur via methods that allow for separation gap and co-axial offsets. For example, wireless transfer may occur if the coils are separated by fractions of the coil diameters, positioned in close proximity (e.g. within centimeters), or if the coils are in direct contact. Additionally, wireless transfer may occur in various mediums, such as a non-gaseous (atmospheric) medium as well as in air or water, depending upon the particular application.

In some embodiments, method 900 may involve, prior to step 910, with a step of establishing communication between a UV, such as UV 20 shown in FIG. 1, and a receiving station, such as receiving station 40 shown in FIG. 1, operatively connected to an energy source, such as contained within storage unit 30. As an example, such a step involves transmitting a first ping 70 from a UV 20 to the receiving station 40 when the UV 20 is within a predetermined distance D 60 from the receiving station 40, as shown in FIG. 1A, and transmitting a second ping 80 from the receiving station 40 to the UV 20 upon receipt of the first ping 70 at the receiving station 40, as shown in FIG. 1A. As an example, the UV is a UUV and the receiving station is located underwater, but as noted above, the UV may be a land-based or air-based UV with the receiving station located either on the land or in the air.

As a further example, if storage units 630 are configured to be autonomous and include the appropriate components, circuitry, and software, UUV 610 could send a first ping to storage unit 630, storage unit 630 could send a second ping to UUV 610 to establish communication, after which storage unit 630 could autonomously position itself such that device 632 is within wireless transmission range with device 614.

In some embodiments, method 900 may proceed to step 930, which involves performing one or more operational scenarios using the UV. Such operational scenarios can include any number of activities for which an UV may be used, such as data gathering, data transfer, surveillance, payload delivery, and the like. After such operational scenarios, the UV may return to the same energy source to receive additional data and/or power or may return to an energy source in another location. In either situation, the unmanned vehicle would receive additional data and/or power using the same process as described in steps 910 and 920 above.

As one example, upon running low on power from one storage unit 630, UUV 610 may return to the same energy source location to "swap out" its current storage unit 630 for a storage unit 630 that is "fully charged". As noted above, UUV 610 may continue with its operational scenarios during power and/or data transmission, rather than waiting for power and/or data transfer to terminate.

Method 900 may be implemented as a series of modules, either functioning alone or in concert, with physical electronic and computer hardware devices. Method 900 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Wireless Power and Data Transfer for Unmanned Vehicles are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the steps of:
positioning a first device and a second device within a wireless transmission range, wherein the second device is operatively connected to an unmanned vehicle, and wherein the first device is operatively connected to an energy source having energy storage, data storage, and a controller that is configured to cause power and data to be sent from the energy source to the unmanned vehicle and is also configured to receive power and data from the unmanned vehicle and route the power and data to the energy storage and the data storage as appropriate; and
wirelessly transferring power and data from the energy source to the unmanned vehicle via the first device and the second device, wherein the first device and the second device are coils,
wherein the step of positioning a first device operatively connected to the energy source and a second device operatively coupled to the unmanned vehicle within a wireless transmission range is performed autonomously using a signal from the unmanned vehicle.

2. The method of claim 1 further comprising the step of, prior to positioning, establishing communication between the unmanned vehicle and a receiving station operatively connected to the energy source by transmitting a first ping from the unmanned vehicle to the receiving station when the unmanned vehicle is within a predetermined distance from the receiving station and transmitting an second ping from the receiving station to the unmanned vehicle upon receipt of the first ping at the receiving station.

3. The method of claim 1, wherein the wireless transmission is performed using one of optical transmission, inductive transmission, magnetic resonance transmission, and ultrasonic transmission.

4. The method of claim 1, wherein the step of positioning a first device operatively connected to the energy source and a second device operatively coupled to the unmanned vehicle within a wireless transmission range is performed passively using a static alignment structure.

5. The method of claim 4, wherein the first device is contained within a mat connected to the energy source and the second device is towed by the unmanned vehicle, wherein passive positioning of the second device is performed by at least one of magnets and mechanical devices disposed on the mat and configured to capture and guide the second device towards the first device.

6. The method of claim 1, wherein the step of positioning a first device operatively connected to the energy source and a second device operatively coupled to the unmanned vehicle within a wireless transmission range is performed autonomously by the first device using machine vision.

7. The method of claim 1, wherein the first device is not in contact with the second device when the first device and the second device are within the wireless transmission range.

8. The method of claim 1, wherein the energy source is a fuel cell, and wherein the first device is integrated within the fuel cell and the second device is integrated within the unmanned vehicle.

9. The method of claim 8 further comprising the steps of:
performing one or more operational scenarios using the unmanned vehicle; and providing the unmanned vehicle with at least one of additional power and additional data by repeating the steps of positioning and wirelessly transferring.

10. A system comprising:
a first device operatively connected to an energy source having energy storage and data storage, the first device comprising a housing having a processor and one or more sensors therein, the processor containing circuitry configured to establish communication with an unmanned vehicle and position the first device within a wireless transmission range to a second device operatively connected to the unmanned vehicle, wherein upon such positioning the processor is further configured to initiate wireless transfer of power and data from the energy source to the unmanned vehicle via the first device and the second device, wherein the first device and the second device are coils, wherein the processor is also configured to receive power and data from the unmanned vehicle and route the power and data to the energy storage and the data storage as appropriate, and wherein the circuitry within the processor is configured to position the first device within the wireless transmission range of the second device autonomously using a signal from the unmanned vehicle.

11. The system of claim 10, wherein the signal is an optical signal and at least one of the sensors is an optical sensor.

12. The system of claim 10, wherein the first device is tethered to the energy source.

13. The system of claim 10, wherein the first device is directly mounted to the energy source.

14. The system of claim 10, wherein the second device is located within the unmanned vehicle.

15. The system of claim 10, wherein the processor further comprises circuitry configured to calibrate the speed of movement of the first device towards the second device.

16. The system of claim 10 further comprising a mat connected to the energy source, wherein the first device is contained within the mat, wherein the second device is towed by the unmanned vehicle, wherein the mat contains at least one of magnets and mechanical devices disposed thereon and configured to capture and guide the second device towards the first device.

17. A system comprising:
a first device operatively connected to an underwater energy source having energy storage and data storage, the first device comprising a housing having a processor therein, the processor containing circuitry configured to establish communication with an unmanned underwater vehicle and to position the first device within a wireless transmission range to a second device connected to the unmanned underwater vehicle, wherein upon such positioning the processor is further configured to initiate wireless transfer of power and data from the underwater energy source to the unmanned underwater vehicle via the first device and the second device, wherein the first device and the second device are coils, wherein the processor is also configured to receive power and data from the unmanned vehicle and route the power and data to the energy storage and the data storage as appropriate, and wherein the circuitry within the processor is configured to position the first device within the wireless transmission range of the second device autonomously using a signal from the unmanned underwater vehicle.

18. The system of claim 17, wherein the first device further comprises one or more sensors therein, wherein at least one of the sensors is an optical sensor and the circuitry contained within the processor is configured to position the first device within the wireless transmission range to the second device using a signal from the unmanned underwater vehicle.

* * * * *